Aug. 8, 1950 — T. P. CAMP ET AL — 2,518,281
LAMINATED STRUCTURE AND ADHESIVE THEREFOR
Filed July 24, 1943
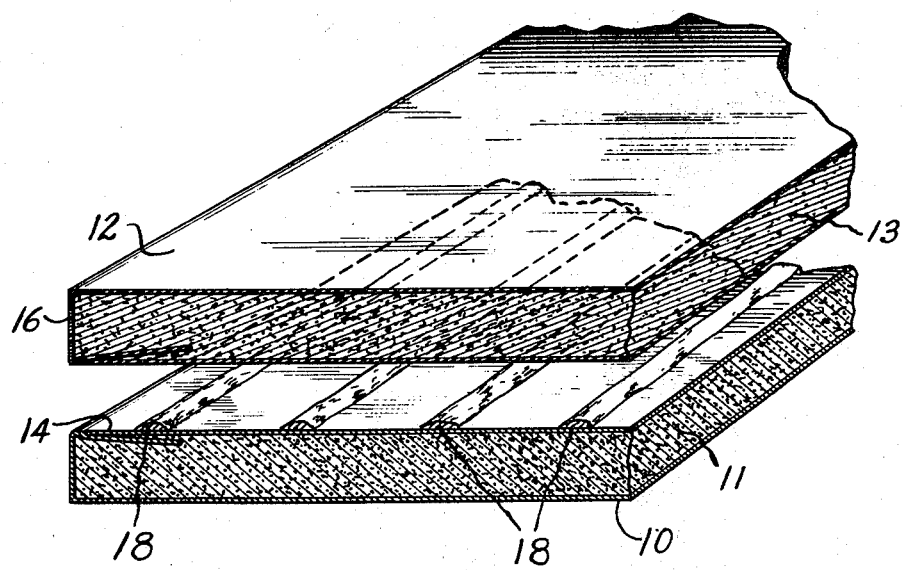
INVENTORS.
Thomas P. Camp
and Chester N. Kolmodin
by T. B. Slisz Atty.

Patented Aug. 8, 1950

2,518,281

UNITED STATES PATENT OFFICE 2,518,281

LAMINATED STRUCTURE AND ADHESIVE THEREFOR

Thomas P. Camp, Arlington Heights, and Chester N. Kolmodin, Chicago, Ill., assignors to United States Gypsum Company, Chicago, Ill., a corporation of Illinois Application July 24, 1943, Serial No. 496,074

5 Claims. (Cl. 154—45.9)

This invention relates to a laminated structure. Though it is particularly referred to the lamination of gypsum wallboard and like materials, it can be readily adapted to other types wherever a water resistant adhesive is particularly desirable.

It, therefore, is one of the many objects of this invention to provide a laminated structure comprising one or more plies of a gypsum wallboard and a water resistant adhesive in combination therewith, which is capable of withstanding the deleterious effect of high humidity and relatively high temperatures encountered in architectural structures.

A further object of this invention is to provide a water resistant adhesive and a method of making the same.

A still further object of this invention is to provide a laminated structure comprising wallboard adhesively secured to form a number of plies, at a low cost and economy in manufacture.

These and other objects, expansions, adaptations, and various modifications will become apparent to those skilled in the art, particularly in view of the specifications underlying the principles of this invention as described. It, therefore, is obvious that such extensions and various modifications are a part of the invention, and are intended to come within the spirit of the principles underlying this invention by the inventors.

Many laminated structures, which consist in the major part of a cellulosic fiber, such as insulation board, pressed paper board, or the like, as well as laminated structures comprising an exterior sheath of cellulosic paper with a core of cementitious materials, like gypsum, cement, or the like, have a tendency when exposed to highly humid conditions and moisture to warp. It has been found, particularly in architectural structures located near bodies of water or highly humid land areas, that relatively large size sheets of laminated structures, such as described above, will frequently bow out to a considerable extent and sometimes fall off when used in ceiling and roof construction. It has been found that, for instance, gypsum wallboard in relatively large size sheets, or lengths, will, under those conditions, sag. Thus it will not only destroy the beauty of the structure, but also impair its usefulness.

After a considerable amount of study and experimentation, it was found that this particular effect is caused by the use of unsuitable adhesive, or methods of attachment between the various plies used in building up a laminated wallboard structure. Obviously, erection methods can to a large degree obliterate this condition, but such additional precautionary measures are expensive, and uneconomical in comparison to the methods of erection used in connection with this invention.

In marine construction the partitions between rooms consist of wallboard. Gypsum board because of its fire resistant nature is frequently used. As an additional fire measure, the gypsum wallboard is sometimes covered with metal sheets. It has been found that under the high humidity conditions encountered, the laminae frequently fall apart, buckle or otherwise become useless.

It has been found after very extensive experimentation and correlation of data that a good index to the suitability of various laminated wallboard structures for use under the conditions specified above, can be obtained by immersing the laminated structure in water maintained at a temperature of 70 degrees Fahrenheit. It has been found that many of the selected adhesives which have been utilized for this purpose have broken down within a very short time of several hours. Of course, there are a number of resins, hardened glues containing an animal or a vegetable protein set with various insolubilizers such as formaldehyde, or other well known materials, asphalts, etc., which will withstand the above test for a greater number of hours. But in each particular case, there is some definite limitation which either prevents their use entirely with the gypsum wallboard, insulation board, or like material. Gypsum wallboard, for instance, can be coated with a solution of a thermo-setting resin, and then placed in a press. The necessary heat to set the thermo-setting resin must be applied from a practical point of view by means of platens in contact with the surfaces of the gypsum board. This means that the heat must travel through the core of the gypsum board, and finally emerge between the two gypsum boards or the junction line containing the resin. Most thermo-setting resins require considerable high heat, which decomposes the core of the gypsum board, and thereby destroys its strength and utility. Likewise, considerable pressure cannot be applied to insulation board, or gypsum wallboard, or materials of like nature, since it will compress them, and, in case of gypsum board, crush the core and render the product useless for further use. Cutback asphalt has also been tried, but under conditions of high humidity and relatively high temperatures encountered at the ceilings of architectural structures, the asphalt has a tendency to flow, and thereby laminated structures either delaminate completely or sag. For the same reason, the use of asphalt emulsions of various types has been found unsatisfactory. Various carbohydrate adhesives have also been tried, but these under the conditions of high humidity weaken rapidly, and cause delamination between the individual plies, which in turn warp and sag.

These unfavorable conditions are further aggravated when metallic sheets are laminated to the wallboard, particularly gypsum board. The metal sheets are impervious to moisture and excessive amounts of moisture that are used in certain types of adhesives cannot be absorbed by the wallboard surfaces. In addition these partitions when used in marine construction are exposed to humid conditions. Because of the preferential moisture absorption by the paper there is a marked tendency in this type of construction to set up strains and stresses which start delamination along all edges.

However, it has been found very unexpectedly that a mixture of asphalt emulsion and a particular type of unrefined, partially dextrinized, farinaceous paste in combination with the asphalt emulsion provides an adhesive which is not only entirely suitable for this type of lamination, but also withstands the most severe tests which a product of this type has encountered under actual construction conditions in the field, as well as in the laboratory. The product of this invention, when immersed in water maintained at a temperature of 70 degrees Fahrenheit, is capable of maintaining its laminated structure until the ingredients themselves comprising the various plies fall apart.

It has been further found that when such failure occurs, as an example, in a laminated gypsum wallboard construction having cellulosic liners at the interface of the lamination the lamination junction still retains its life, and maintains its adhesive bond between the two adjacent cellulosic sheets or membranes although the wallboard core is destroyed.

This action is entirely unexpected, since emulsified asphalt alone, or the partially dextrinized, farinaceous paste when used alone do not give comparable results. Yet the combination of these two materials when used in the proportions specified hereinbelow have been able to withstand immersions in water maintained at a temperature of 70 degrees for more than twenty-four hours, and in many cases where the bond was perfectly united between the adjacent laminae, it has withstood such immersion for more than six days. This test is particularly severe when considered in light of its ultimate use under architectural conditions. Neither ceilings nor walls are immersed in water for a number of days, particularly when such walls are made of gypsum wallboard, or insulation board, or material of like nature.

It has been found that a typical formulation made in accordance with formula given below yields very satisfactory results, and is capable of withstanding such tests, as indicated above.

*Formula 1*

|   | Per cent |
|---|---|
| Emulsified asphalt (clay type) | 5 to 15 |
| Partially dextrinized, farinaceous paste, substantially as described below | 5 to 15 |
| Water to make up | 100 |

In preparing this formulation, it is desirable to make a smooth paste by adding in increments the partially dextrinized, farinaceous paste to the water, and stirring it after each increment until the paste is uniformly smooth. This paste is then added to the asphalt emulsion, and the two blended together with the gradual addition of a sufficient amount of water to make up 100 per cent. Though this procedure can be varied somewhat, it is desirable to follow it since a uniform mixture is obtained and can be readily spread upon the surface of the materials to be laminated. It is desirable that the water used in the preparation of the adhesive should be relatively free of reagents which may have a tendency to break the asphalt emulsion, or otherwise impart a deleterious effect to this adhesive mixture.

The emulsified asphalt used in the preparation of this adhesive is of the clay type, and contains approximately 45 to 50 per cent of asphalt. There are a number of excellent sources of this material on the market, and it has been found that the formulation sold under the mark N13HPC asphalt emulsion is but one of the many that can be used. The partially dextrinized, farinaceous paste is a type of a corn flour paste, which is obtained by passing the "grits" from corn through a combination screw conveyor and a heater which has a heating jacket to heat the "grits" for a period of about one hour, with the steam in the jacket being maintained at a pressure of 60 to 100 pounds per square inch. These heated "grits" are then put into flake form by passing between a scraper knife, and a roll heated to 250 degrees to 300 degrees Fahrenheit by the friction due to breaking up the "grits." The process of heating the corn "grits" causes a small portion of the same to be dextrinized. The resulting flakes are then ground up to form the paste, which is used in this invention in combination with the asphalt emulsion described herein above. For a more complete description of the nature and analysis of the partially dextrinized, farinaceous paste used herein, reference should be had to the Roos' Patent No. 2,044,401, issued June 16, 1936.

It has been found that a particularly useful formulation for use in laminated gypsum wallboard structures comprises the following formula:

*Formula 2*

|   | Per cent |
|---|---|
| Emulsified asphalt (clay type) | 5 |
| Partially dextrinized, farinaceous paste, substantially as described | 10 |
| Water | 85 |

The above formulation has been found particularly useful in connection with gypsum wallboard when applied at the rate of 100 grams per square meter of the area to be laminated.

Obviously, such small quantities can only be applied preferably as a series of ridges or lines of sufficient height and uniformly distributed over the entire surface to provide the maximum of point contact, between the surfaces of the wallboards comprising the laminated construction. Ordinary gypsum wallboard in the course of its manufacture, though maintained to close thickness tolerances, varies imperceptibly in thickness throughout the area of the board. Obviously under such conditions, the height of the ridge of the adhesive that is applied to the surface must be sufficient to contact the abutting surface. Therefore, the minimum height that an adhesive can be applied is controlled to a marked degree by the imperceptible variation in the thickness of the gypsum wallboard. Under the above conditions and slight variations in the thicknesses of gypsum wallboard, it is naturally desirable that the adhesive be applied in the form of ridges, rather than be applied by means of conventional coater rolls or knives.

The drawing forming a part of this application for Letters Patent, illustrates the preferred type of glue application. For purposes of illustration only and not as a limitation of the principles underlying this invention, a single lamination is shown illustrating the ridge method of application of the adhesive composition of this invention in combination with gypsum wallboard. 11 and 13 represent one or more layers of gypsum wallboard or other materials to be laminated. 18 represents the composition of this invention applied as ridges across the face of the sheet 11. It is obvious that it can be applied on the contacting face of the sheet 13 or on any other sheets used in making up the combination. Likewise it is self-evident that equivalent means of applying the composition may be used. For instance dabs or spots of the adhesive composition may be placed about the surface of either one or both of the wallboards, and the assembly laminated by following conventional lamination practice. However, regardless of what type of method is used, it is vitally important that the adhesive composition be distributed in such manner as to assure the maximum holding power.

In view of the present state of knowledge of technology underlying the principles of this invention, no special theory can be formulated regarding the peculiar and unexpected action of the combination of the partially dextrinized, farinaceous paste, substantially as described hereinabove, and an emulsified asphalt of the clay type. A number of different theories have been postulated, but it is not the intention of the inventors to be bound thereby, since obviously various expansions, modifications, adaptations, as well as variations of the principles underlying this invention, as defined in the hereto appended claims and substantially described hereinabove, can be used.

We claim:

1. A laminated structure comprising a plurality of gypsum boards, each of the said gypsum boards composed of a gypsum core and cellulosic paper surfacings thereon and an adhesive between said boards, the said adhesive comprising an emulsified asphalt and a partially dextrinized farinaceous paste consisting wholly of heat treated corn grits.

2. In the laminated structure of claim 1, wherein the said emulsified asphalt is an emulsified asphalt of the clay type.

3. In the laminated structure of claim 1, wherein the said adhesive comprises the following ingredients substantially in the ranges shown below:

| | Per cent |
|---|---|
| Emulsified asphalt | 5 to 15 |
| Partially dextrinized, farinaceous paste derived wholly from heat treated corn grits | 5 to 15 |
| Water to make | 100 |

4. An adhesive whose products of interaction are capable of withstanding immersion without dissolution for at least 24 hours in water maintained at a temperature of 70 degrees F. comprising

| | Per cent |
|---|---|
| Emulsified asphalt | 5 to 15 |
| Partially dextrinized farinaceous paste derived wholly from heat treated corn grits | 5 to 15 |
| Water to make | 100 |

5. In the adhesive of claim 4, wherein the said emulsified asphalt is an emulsified asphalt of the clay type.

THOMAS P. CAMP.
CHESTER N. KOLMODIN.

REFERENCES CITED

The following references are of record in the file of this patent:

UNITED STATES PATENTS

| Number | Name | Date |
|---|---|---|
| 1,329,232 | Erler | Jan. 27, 1920 |
| 1,353,510 | Baumgartel | Sept. 21, 1920 |
| 1,474,657 | Walper | Nov. 20, 1923 |
| 1,507,332 | Buttress et al. | Sept. 2, 1924 |
| 1,568,314 | Buttress et al. | Jan. 5, 1926 |
| 1,664,601 | Ellis | Apr. 3, 1928 |
| 1,793,810 | Levin | Feb. 24, 1931 |
| 1,870,439 | Birdsey | Aug. 9, 1932 |
| 1,914,345 | Roos | June 13, 1933 |
| 2,014,406 | Weed | Sept. 17, 1935 |
| 2,017,022 | Roos | Oct. 8, 1935 |
| 2,035,122 | Fulton | Mar. 24, 1936 |
| 2,044,401 | Roos | June 16, 1936 |
| 2,051,025 | Bauer | Aug. 18, 1936 |
| 2,282,177 | Dike et al. | May 5, 1942 |
| 2,366,943 | Treadway | Jan. 9, 1945 |